(12) United States Patent
Molinari

(10) Patent No.: US 8,647,467 B2
(45) Date of Patent: Feb. 11, 2014

(54) SYSTEM AND METHOD FOR REMOVING THE OUTER LAYER OF A LAYERED ARTICLE

(75) Inventor: Arthur Molinari, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 11 days.

(21) Appl. No.: 13/436,199

(22) Filed: Mar. 30, 2012

(65) Prior Publication Data

US 2013/0255888 A1    Oct. 3, 2013

(51) Int. Cl.
*B32B 38/10*    (2006.01)

(52) U.S. Cl.
USPC ........... 156/711; 156/703; 156/716; 156/717; 156/752; 156/762; 156/765

(58) Field of Classification Search
USPC .......... 156/703, 711, 716, 717, 752, 762, 765
See application file for complete search history.

(56) References Cited

U.S. PATENT DOCUMENTS

| | | |
|---|---|---|
| 1,533,563 A | 4/1925 | Sabatino |
| 4,779,387 A | 10/1988 | Reid et al. |
| 4,894,958 A | 1/1990 | Takasaki |
| 5,389,169 A | 2/1995 | McRae |
| 5,472,330 A | 12/1995 | Oka et al. |
| 5,609,535 A | 3/1997 | Morgan |
| 5,976,430 A | 11/1999 | Kataoka et al. |
| 6,833,098 B2 | 12/2004 | Watabe et al. |
| 2012/0266433 A1* | 10/2012 | Ono ............................ 29/426.5 |

FOREIGN PATENT DOCUMENTS

| | | |
|---|---|---|
| JP | 10179808 A | 7/1998 |
| KR | 100538945 B | 12/2005 |

* cited by examiner

*Primary Examiner* — Mark A Osele
(74) *Attorney, Agent, or Firm* — Plumsea Law Group, LLC

(57) ABSTRACT

A system and method for refurbishing or recycling a layered article such as a golf ball is disclosed that includes removing a cover from the article. The system can include a golf ball guide, a golf ball scorer-driver that can score the outer shell of the golf ball while simultaneously advancing it along the golf ball guide, a cover peeler having an orifice with an inner diameter that is less than an outer diameter of the golf ball cover, and a press that can drive the golf ball core through the cover peeler orifice. The method includes inducing at least one weakened region in the outer shell of the golf ball, rupturing the weakened region to create at least one opening in the golf ball outer shell, and forcing a core portion of the golf ball through the opening in the golf ball outer shell.

21 Claims, 7 Drawing Sheets

SYSTEM AND METHOD FOR REMOVING THE OUTER LAYER OF A LAYERED ARTICLE

FIELD

The present disclosure relates generally to a system and method for peeling or removing the outer layer(s) of a layered article, such as removing a golf ball cover from a golf ball. In addition, the present disclosure relates to a system and method for refurbishing or recycling the layered article, including peeling or removing a golf ball cover from a golf ball.

BACKGROUND

Golf balls generally include a soft core covered by a hard shell, such as a synthetic resin outer shell. The soft core typically includes one or more layers of rubber or other resilient material and often includes an inner wound ball. The soft core experiences far less wear and tear during use than the outer shell and can be reused multiple times if recycled to replace the outer shell without degrading the core through the recycling process.

In contrast, the outer shell suffers the majority of the wear and tear to the golf ball during use, such as receiving blows that can form cuts, scrapes, nicks and abrasions in the outer shell and cause overall thinning of the shell and features on it, such as dimples. Although the useful life of the ball is governed by many factors, it is significantly governed by the durability of its outer shell and the shell's ability to withstand the various impacts that are typically encountered by the ball during use without the cover ripping, tearing or otherwise failing.

In addition, the useful life of the ball is significantly affected by the outer shell's ability to retain its shape and its advantageous features during use. Advantageous features such as the ball's surface texture and its dimple configuration provide many of the aerodynamic properties for the ball, without which the ball is generally deemed no longer useful. As the outer shell wears or otherwise degrades, aerodynamic performance of the ball typically degrades as well due to changes in the outer shell features, which render the ball no longer useful for its intended purpose.

Recycling or refurbishing golf balls after their useful life by replacing the outer cover instead of disposing of the balls can avoid unnecessary industrial waste and reduce golfing expenses for the user. In order to effectively recycle a conventional two-part golf ball, the core of the used golf ball can be refurbished by replacing the worn cover with a new cover. In order to do this, the worn outer shell needs to be peeled or otherwise separated from the softer core in an efficient, cost-effective manner that avoids damaging the core.

Conventional methods and equipment for peeling a golf ball shell from its core for recycling or refurbishing purposes often damage or impair the core and are inefficient, time-consuming and/or relatively expensive. Thus, used golf balls are typically disposed of rather than recycled or refurbished. Accordingly, it would be beneficial to provide efficient and relatively inexpensive system and method for refurbishing or recycling a golf ball including removing the cover from the golf ball.

SUMMARY

A system and method for refurbishing or recycling a golf ball including peeling or removing a golf ball cover from a golf ball are generally disclosed.

A method for refurbishing or recycling a golf ball can include removing a golf ball cover from its core portion. This can include inducing at least one weakened region in the outer shell of the golf ball, rupturing the at least one weakened region to create at least one opening in the golf ball outer shell, and forcing a core portion of the golf ball through the at least one opening in the golf ball outer shell. A method for refurbishing or recycling a golf ball can also include warming a golf ball to soften its outer shell, such as via submersion in a heated medium like a pool of heated water or other heated liquid or via exposure to another heated transfer medium.

In addition, a method for refurbishing or recycling a golf ball can include creating weakened regions in the outer shell of the golf ball while simultaneously advancing the golf ball through a heated medium. Further, a method for refurbishing or recycling a golf ball can include creating weakened regions in the outer shell of the golf ball while simultaneously advancing the golf ball toward an orifice formed in a cover peeler.

A system for removing a golf ball cover from a golf ball core can include a golf ball guide, a golf ball scorer-driver configured for scoring the outer shell of a golf ball while simultaneously advancing the golf ball along a portion of the golf ball guide, a golf ball cover peeler having an orifice formed therein having an inner diameter that is less than an outer diameter of the golf ball cover, and a press configured to drive the golf ball core through the golf ball peeler orifice. The scorer-driver can include a scuffer, a saw, a chain drive or another device configured for scoring the outer shell of the golf ball or inducing failure regions in the outer shell of the golf ball. The press can include a drive mechanism for forcing the golf ball core through the golf ball cover peeler orifice and the golf ball cover peeler orifice can include an opening having an inner diameter that is less than the outer diameter of the golf ball.

These and other advantages and features of novelty characterizing aspects of the invention are pointed out with particularity in the appended claims. To gain an improved understanding of the advantages and features of novelty, however, reference can be made to the following descriptive matter and accompanying figures that describe and illustrate various configurations, concepts and features related to the invention.

BRIEF DESCRIPTION OF THE DRAWINGS

The invention can be better understood with reference to the following drawings and description. The components in the figures are not necessarily to scale, emphasis instead being placed upon illustrating principles and features of the invention. Moreover, in the figures, like reference numerals designate corresponding parts throughout the different views.

FIG. 3A is shown without an example golf ball and FIG. 3B is shown with an example golf ball in a position prior to having its cover removed.

FIG. 4A is shown without an example golf ball and FIG. 4B is shown with an example golf ball in a position prior to having its cover removed.

DETAILED DESCRIPTION

The present disclosure relates to systems and methods for recycling or refurbishing layered articles, where the first step of the process involves removing one or more of the outer layers of the article. The examples and discussion herein are limited to golf balls, although the process may be used for any layered articles, including other types of balls, consumable items such as foods, and other industrial and consumer products.

Golf ball recycling or refurbishing may include removing or peeling the outer shell or cover of the ball from its inner core. An example golf ball that can be used with the exemplary systems and methods described herein is also disclosed. Example configurations of a golf ball structure will first be described followed by descriptions of exemplary systems and methods pertaining to recycling or refurbishing a golf ball that include removing or peeling a golf ball cover or outer shell from an inner golf ball core region.

Figure 1A:
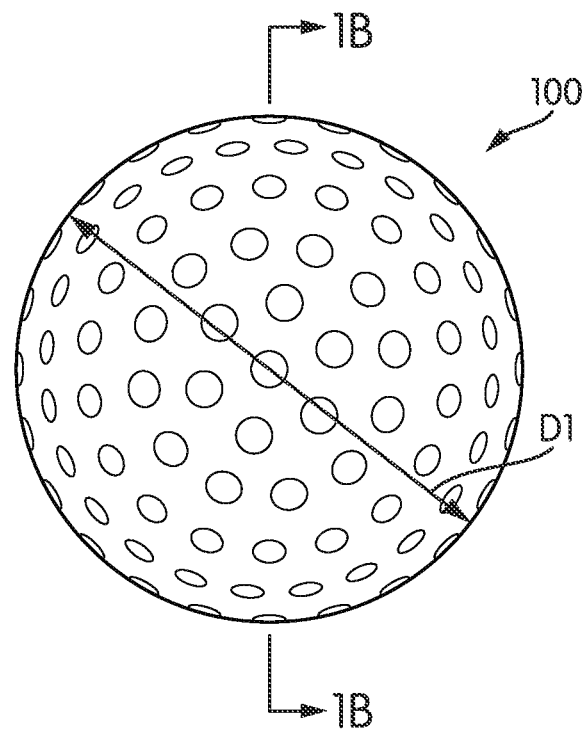
FIG. 1A shows a golf ball having an example configuration.
Figure 1B:
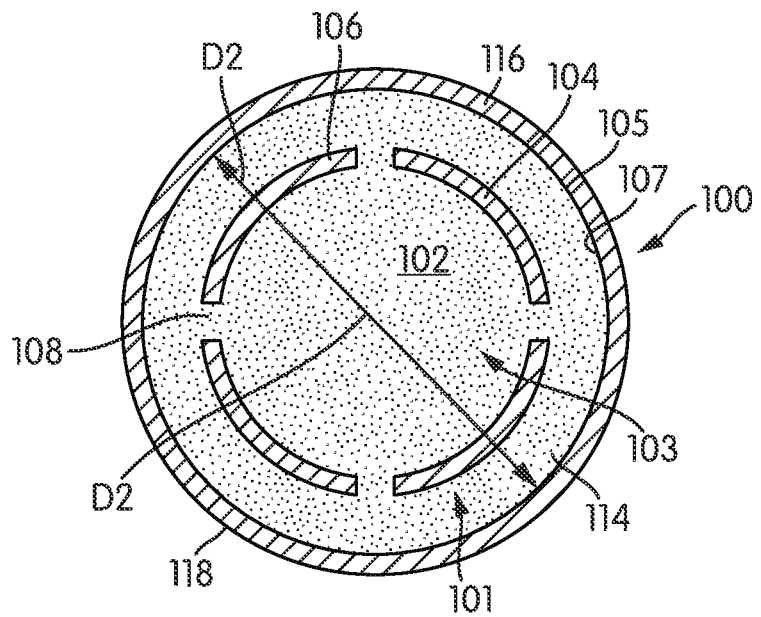
FIG. 1B is a cross-sectional view of the example golf ball of FIG. 1A taken along line B-B.

Turning initially to FIGS. 1A and 1B, a configuration of an example golf ball 100 is shown. Golf ball 100 can include a plurality of parts in various configurations, which can generally be described as an outer shell or golf ball cover 116 and an inner core region or core portion 103. In general, any known core construction may be provided: a single layer core, a multi-layer core with a center core surrounded by one or more intermediate and/or outer core layers. Additionally, one or more mantle layers may be provided.

Inner core portion 103 can include multiple components and/or layers, such as a center core 102, an outer core layer 104, and a medial core layer 114. Core layers can be connected to other layers via mechanically connections, such as interconnecting features at various locations, via chemical connections, such as adhesive bonds, or via combinations of these and/or other connection mechanisms, such as arms or living hinges connecting the layers. For instance, outer core layer as shown includes a plurality of voids 106 formed between the center core 102 and the medial core layer 114, as well as a plurality of interconnecting arms 108 connecting the central core to the medial core layer, which can provide flexibility between the core layers. However, the various core layers generally form an overall inner golf ball core region or core portion 103 that is softer than the outer shell 116.

Center core 102 forms the innermost layer of the inner core portion 103 and outer core layer 104 partially surrounds and is positioned radially outward of center core 102. Medial core layer 114 in the example golf ball 100 is the outermost core layer, and it at least partially surrounds and is positioned radially outward of outer core layer 104 while being disposed inward of cover 116. Outer shell or cover 116 at least partially surrounds and is positioned radially outward of medial core layer 114. As such, example golf ball 100 can be considered as including four layer—three of which generally form the overall inner core region 103 including all the sub-parts (center core 102, outer core layer 104, and medial core layer 114), and the harder outer shell or cover 116 that forms the external layer or external part of golf ball 100.

Many different types of golf balls can be used along with the systems and methods described herein. For example, outer core layer 104 can be generally hollow and substantially spherical. In a commercial version, cover 116, and in particular, outer surface 118 of cover 116, would be configured to be struck by a golf club. Accordingly, cover 116 can include various dimples, frets or lands, projections, printing, or any other features that may be desirable in affecting the flight path of ball 100 or impart characteristics to the ball that could be desirable to the user. The particular patterns on cover 116 may be determined by a person having ordinary skill in the art. Cover 116 can be designed to be scuff resistant and can be made of any material deemed desirable for a golf ball cover, such as SURLYN or other polyurethane elastomer that has appropriate properties for a golf ball cover.

As noted above, in some configurations cover 116 can be secured to inner core portion 103 via chemical means. For example, an adhesive may be applied to outer surface 105 of medial core layer 104 and/or inner surface 107 of cover 116. Cover 116 may then be applied to outer surface 105. In some configurations, cover 116 can be over molded directly on inner core portion 103. In other configurations, cover 116 can be made in two parts that are then pressed on inner core portion 103 and fused together along a joinder line (not shown). When cover 116 comes into contact with inner core portion 103, the adhesive can cause cover 116 and inner core portion 103 to chemically bond with one another. The adhesive can bond cover 116 and inner core portion 103 and minimize the relative movement therebetween without the need for a physical locking structure to be molded into either cover 116 or inner core portion 103.

The material selected to be used to form the inner core portion 103 can include various materials typically used in manufacturing cores or other interior layers of a conventional golf ball. For example, the first material can be a thermoplastic urethane, highly neutralized polymer, or rubber, such as a polybutadiene rubber. In many configurations, it may be useful to use a material that is solid, rather than liquid, at room temperature.

Ball 100 was described above as having four layers, namely, center core 102, outer core layer 104, medial core layer 114, and cover 116. The core layers generally form an overall inner core region or core portion 103 having an outer diameter D2, which is less than a cover outer diameter D1 that can also be the overall outer diameter of the golf ball. Ball 100 has been shown as an example configuration for illustrating features of the systems and methods described hereafter. However, it is understood that golf balls used along with the systems and methods described hereafter can have various other configurations while still generally maintaining a conventional golf ball arrangement having a hard outer shell or cover that can be peeled or removed from the softer inner core portion in order to refurbish or recycle the golf ball.

As noted previously, outer shell 116 desirably forms the outer surface of the ball to be struck by a user's club and, as such, typically suffers the greatest degradation and wear during use in comparison with the softer inner core portion. When a golf ball approaches or reaches the end of its useful life, it is typically because the outer shell is approaching or has reached the end of its useful life. In many such situations, the softer inner core has a significant amount of useful life remaining and the golf ball could be refurbished or recycled if the hard outer shell could effectively and efficiently be removed from the softer inner core portion and replaced with a new outer shell. The example systems and methods described hereafter can allow used golf balls, such as golf ball 100, to be refurbished or recycled for continued usefulness by removing and replacing the golf ball outer shell 116.

Turning now to FIGS. 2-10, various systems and methods that can be used to recycle or refurbish a golf ball are disclosed, which will be described using example golf ball 100 noted above. These systems and methods are described by way of various example configurations that include a variety of features and options that may be used in various combinations and in other configurations not disclosed herein. In many instances, other features may easily be substituted for those disclosed herein. Many potential alternatives, optional features and modifications to those disclosed specifically described have also been noted herein. A person having ordinary skill in the art can make such substitutions and modifications, which should be considered to come within the scope of the disclosure.

Figure 2:
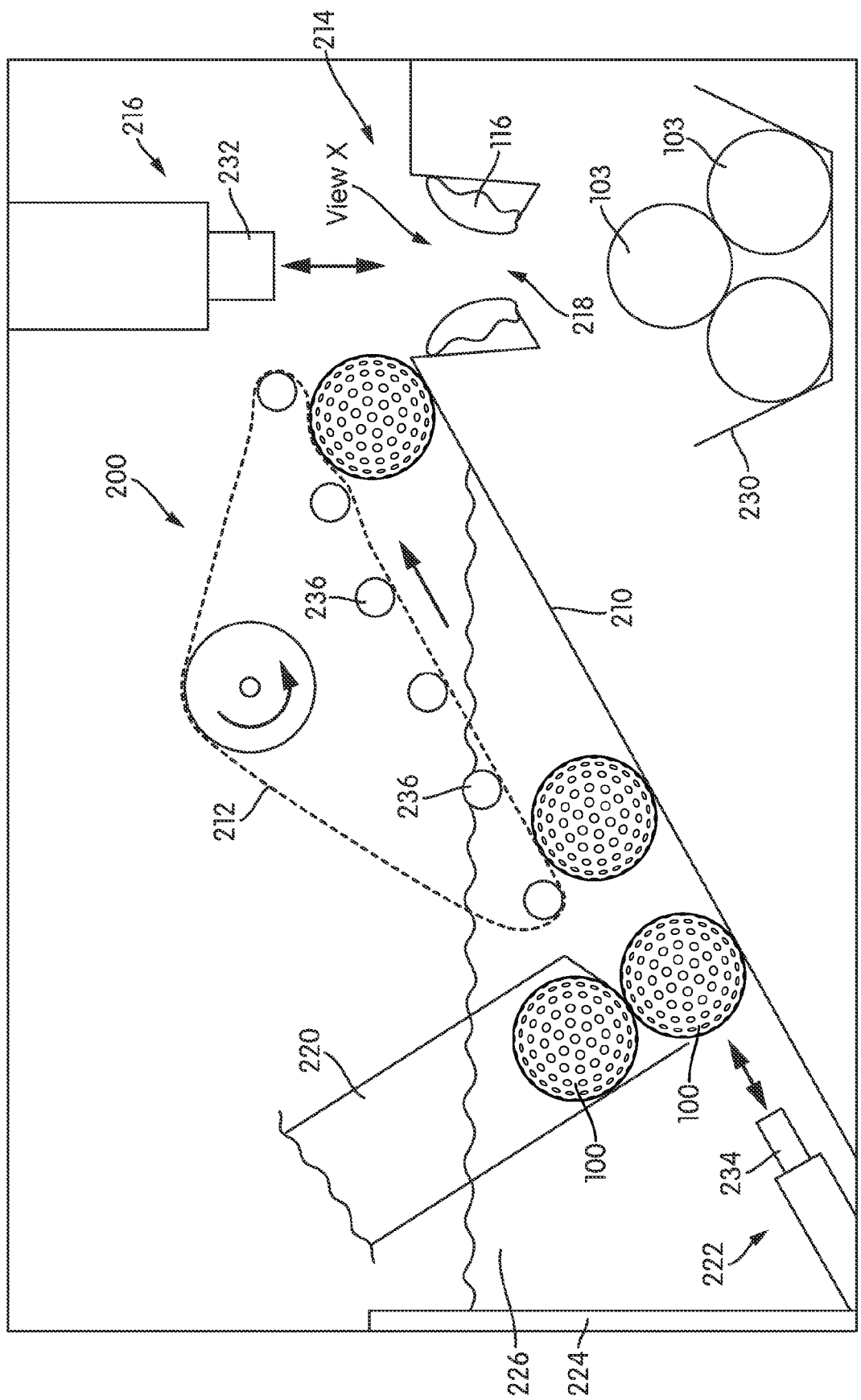
FIG. 2 shows a portion of a first example system for recycling a golf ball that includes removing a golf ball outer shell portion from the golf ball.

Referring specifically now to FIG. 2, a first example system 200 is shown in schematic form as a portion of a system for recycling a golf ball that includes removing a golf ball outer shell portion from the golf ball. As shown, first example system 200 generally includes a golf ball guide 210 (e.g., a channel or guide slot), a golf ball scorer-driver 212, a golf ball cover peeler 214, and a press 216 that can drive a golf ball core portion through a peeler orifice 218 of the golf ball cover peeler. The first system 200 can also include a golf ball delivery device 220 (e.g. a drop tube 220), a loader 222, a pre-treatment container 224, a pre-treatment medium 226 and a core receiving container 230. The golf ball guide 210 can be a track, channel or other feature configured to guide golf balls, such as example golf ball 100, while they are being processed in system 200.

Press 216 can include various devices configured to drive the core portion 103 of a golf ball 100 through peeler orifice 218 of the golf ball cover peeler 214, such as an extensible hydraulic, electric or pneumatic press. The illustrated configuration includes an extensible press 216 having a drive member 232 that extends and retracts to drive core portions through the peeler orifice. Similarly, loader 222 can include various devices configured to advance a golf ball 100 when appropriate for processing through first system 200. The illustrated example configuration of FIG. 2 shows an extensible loader 222 having a load member 234 that extends and retracts to advance the golf balls into contact with scorer-driver 212.

Golf ball scorer-driver 212 can include various devices configured for urging golf balls 100 along guide 210 toward cover peeler 214 while substantially simultaneously inducing at least one weakened region in the outer shell of the golf ball. In the example configuration of FIG. 2, scorer-driver 212 is shown as a flexible driven chain 212 being rotated/advanced in the direction of the illustrated arrows. Chain 212 contacts an upper portion of the golf balls 100 disposed along guide 210 and urges them toward the cover peeler 214 based on contact with their outer shells.

In addition, while urging the golf balls forward, chain 212 can substantially simultaneously induce one or more weakened regions in the outer shells of the golf balls via scratching, scuffing, gouging, cutting or otherwise displacing and/or removing discrete portions of the golf ball outer shells, which become weakened regions in the outer shells. Chain 212 can induce the one or more weakened regions in various ways, such as via interfering contact with the golf balls as the balls pass through tight passes created by chain rollers 236 or other features along the guide path or via barbs or cutting blades extending from the chain that cut or gouge into the golf ball outer shells when making contact with them.

First system 200 as shown in FIG. 2 includes various features as examples of options and enhancements that can be used with such systems. For instance, golf ball delivery device 220 in the form of a drop tube 220 can provide a substantially constant and controlled supply of golf balls for the system in an automated configuration. Loader 222 can periodically urge a golf ball forward that is provided by drop tube 220 such that it contacts chain 212 along guide 210 and is thereby driven forward along the guide. FIG. 2 also illustrates an arrangement for providing pre-treatment features, which can provide advantages or enhance the overall golf ball recycling process.

As shown in FIG. 2, a pre-treatment container 224 can retain a pre-treatment medium 226 through which the golf balls can pass while advancing through portions of first system 200. Pre-treatment medium can be a warming fluid that can heat golf balls prior to removing their outer shells. In some configurations, the application of a heat treatment can improve the results for the remainder of the recycling process. In other configurations, it may be desirable to provide a supplemental chemical or other soak treatment via the pre-treatment medium 226, which can be considered equivalent to the heating treatment noted.

Further, the pre-treatment medium 236 could be a gas or gel, but in many configurations is likely to be a liquid and can primarily be heated water. Pre-treatment medium 226 can be selected in cooperation with the material from which the cover of ball 100 is made to make it easier to remove the cover or otherwise perform recycling processing. For instance, pre-treatment medium 226 can include chemicals for changing the properties of the golf ball cover, such as softening the cover. In some configurations, pre-treatment medium 226 can be a heated water bath and in other configurations it can be an acid, base or solvent that chemically reacts with the cover of ball 100.

In some configurations, the pre-treatment process via medium 226 can make it easier to separate the cover from the inner core portion of the ball when it is forced through the cover peeler. In some configurations, a heat soak can allow the cover 116 of the ball to be split or weakened more easily and for the adhesive securing it to the inner core portion to deteriorate, so that the cover can be removed more easily. In another configuration, treatment via a cold pre-treatment medium or chemical pre-treatment medium can make the cover and adhesive more brittle, which can allow it to more easily be broken and removed from the core portion. As illustrated in FIG. 2, the first system 200 removes the cover 116 from the core portion 103 by forcing the softer core portion 103 through peeler orifice 218, while edge portions of the orifice catch the cover and retain it while the core portion is forced through the peeler orifice and out of the cover. In some configurations, the softer core portion 103 is essentially extruded through orifice 218 into core receiving container 230 due to its flexibility and malleability, while the generally stiff outer shell 116 is retained by edge portions of the cover peeler orifice.

Figure 3A:
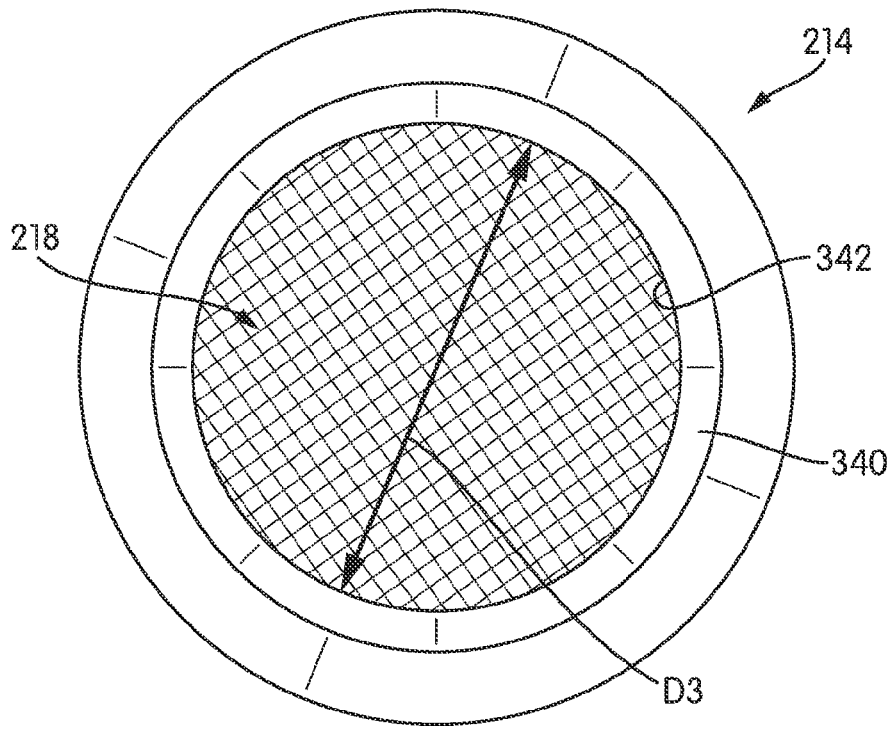
FIGS. 3A and 3B are top views of a first configuration of an example cover peeler that could be used along with recycling systems including the first example system of FIG. 2 and the second example system of FIG. 5.
Figure 3B:
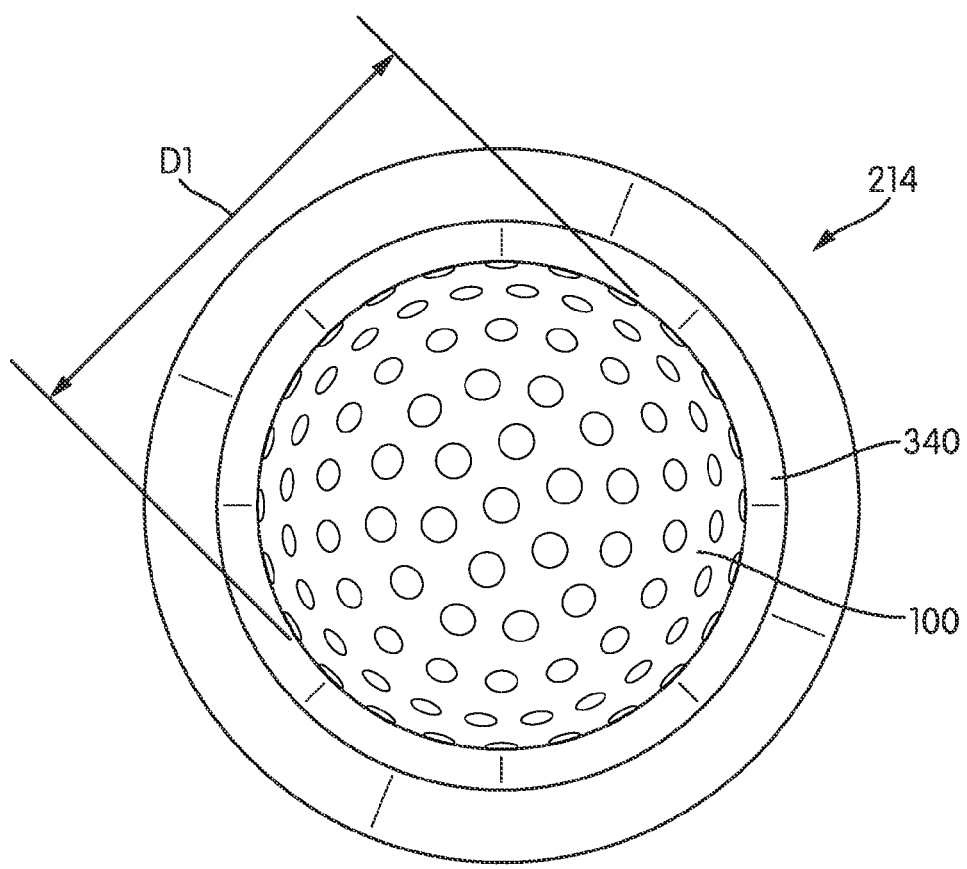

The cover peeler portion of first system 200 is illustrated in further detail in FIGS. 3A and 3B. FIGS. 3A and 3B are top views of cover peeler 214 taken from View X of FIG. 2. As shown in FIG. 3A, cover peeler 214 can include cover retainer 340 that forms the gripping edge portions within peeler orifice 218 through which the core portions are extruded. In the configuration of FIGS. 3A and 3B, cover retainer 340 is generally configured as a ring disposed about orifice 218 having blade-like edge portions 342 that can catch the rigid outer shell 116 when golf ball 100 is forced into the cover peeler orifice. In the configuration shown in FIG. 2, cover retainer 340 is generally angled upward to encourage edge portions 342 to bite into cover 116 quickly when interfering contact is made between the golf ball and the cover retainer. However, cover retainer 340 can have a wide variety of configurations and orientations that effectively retain cover 116 while inner core portion 103 is being forced through the cover peeler orifice, such as being generally perpendicular to the axis extending through cover peeler orifice 218.

The inner diameter D3 of peeler orifice 218 at edge portions 342 is preferably less than the outer diameter D1 of the golf ball cover. As such, interfering contact is made between golf ball cover 116 and peeler orifice edge portions 342 when the golf ball is forced toward the peeler orifice, which retain the cover and causes it to fail along one or more weakened regions induced in the cover. As press 216 continues to advance toward peeler orifice 218, the core portion 103 is forced through the one or more failed weakened regions of the cover and through the peeler orifice 218 into core container 230 (see FIG. 2). Due to the flexibility and malleability of the core portion, core portion 103 can generally be extruded through the one or more weakened regions and peeler orifice 218 as it is pressed out of the cover.

It is understood that golf ball outer diameter D1 can be larger or smaller than a golf ball's typical outer diameter during use at ambient temperatures after golf ball 100 has been processed through first system 200, such as after being warmed via pre-treatment medium 226 and/or being exposed to chemical treatment via pre-treatment medium 226. For instance, golf ball 100 may expand after being warmed and have a larger outer diameter than at ambient usage temperatures. As such, inner diameter D3 of the peeler orifice can be sized relative to the anticipated outer diameter D1 of golf ball cover 116 and/or the anticipated outer diameter D2 (FIG. 1B) of golf ball core portion 103 just prior to being forced through peeler orifice 218 rather than their typical dimensions at ambient temperatures during use as golf ball.

Figure 4A:
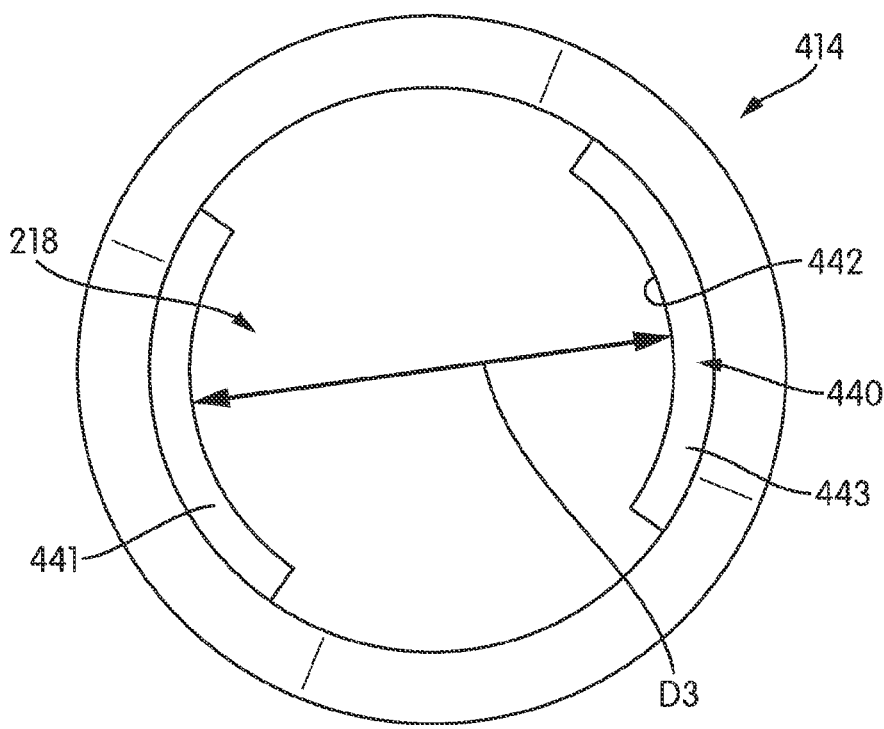
FIGS. 4A and 4B are top views of a second configuration of an example cover peeler that could be used along with recycling systems including the first example system of FIG. 2 and the second example system of FIG. 5.
Figure 4B:
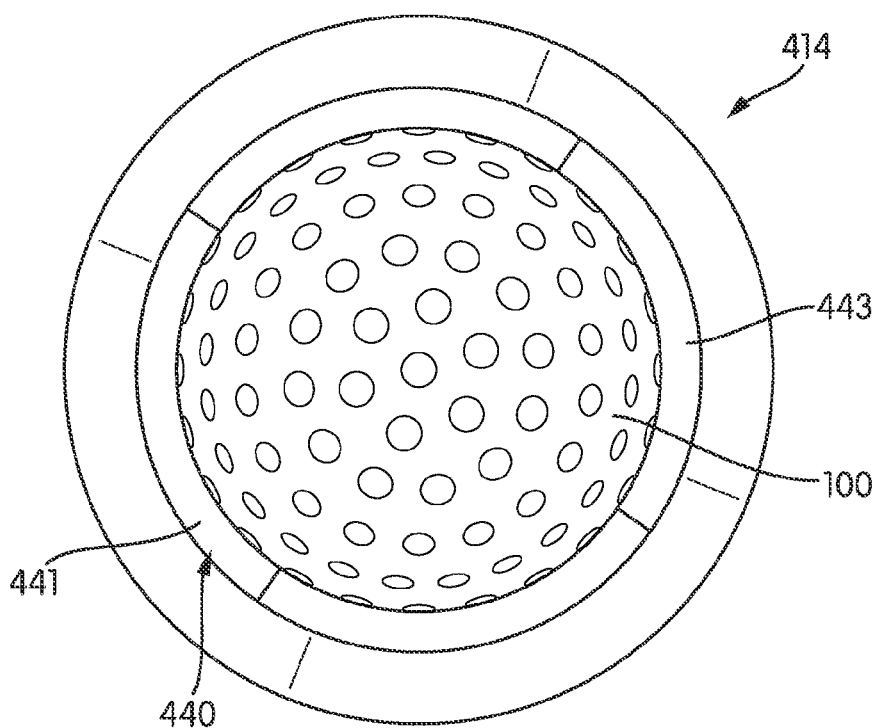

Turning now to FIGS. 4A and 4B, another example configuration of a cover peeler 414 is shown, which can also be representative of cover peeler 214 shown in FIG. 2. Cover peeler 414 generally includes the same aspects and preferences as cover peeler 214 shown in FIGS. 3A and 3B except with respect to differences noted pertaining to cover retainer 440. Cover retainer 440 in the configuration shown in FIGS. 4A and 4B includes a pair of opposing arc-shaped catches 441 and 443 within the edge portions of peeler orifice 218, which cooperate to engage and retain portions of the rigid outer shell 116 when golf ball 100 is forced into the cover peeler orifice. As noted above for FIGS. 3A and 3B, catches 441 and 443 can generally be angled upward to encourage their edge portions 442 to bite into cover 116 quickly when interfering contact is made between the golf ball and the cover retainer.

The use of separated and opposing catches can improve their ability to engage and bite into the cover 116 over a smaller engagement area compared with the ring configuration of FIGS. 3A and 3B. Further, a separated catch arrangement can provide space at the gaps between the catches for the core to squeeze into as needed when being pressed out of the cover. Various other separated catch configurations can also be used that can provide differing advantages, such as configurations having more than two catches (e.g., 3, 4 or many small catches) spaced about inner edges of peeler orifice 218. Other catch configurations can include saw-shaped or other shaped edge portions (not shown) instead of the generally straight configuration shown for edge portions 442, which can enhance engagement and retention of the cover and can assist with inducing failure of the cover.

Figure 5:
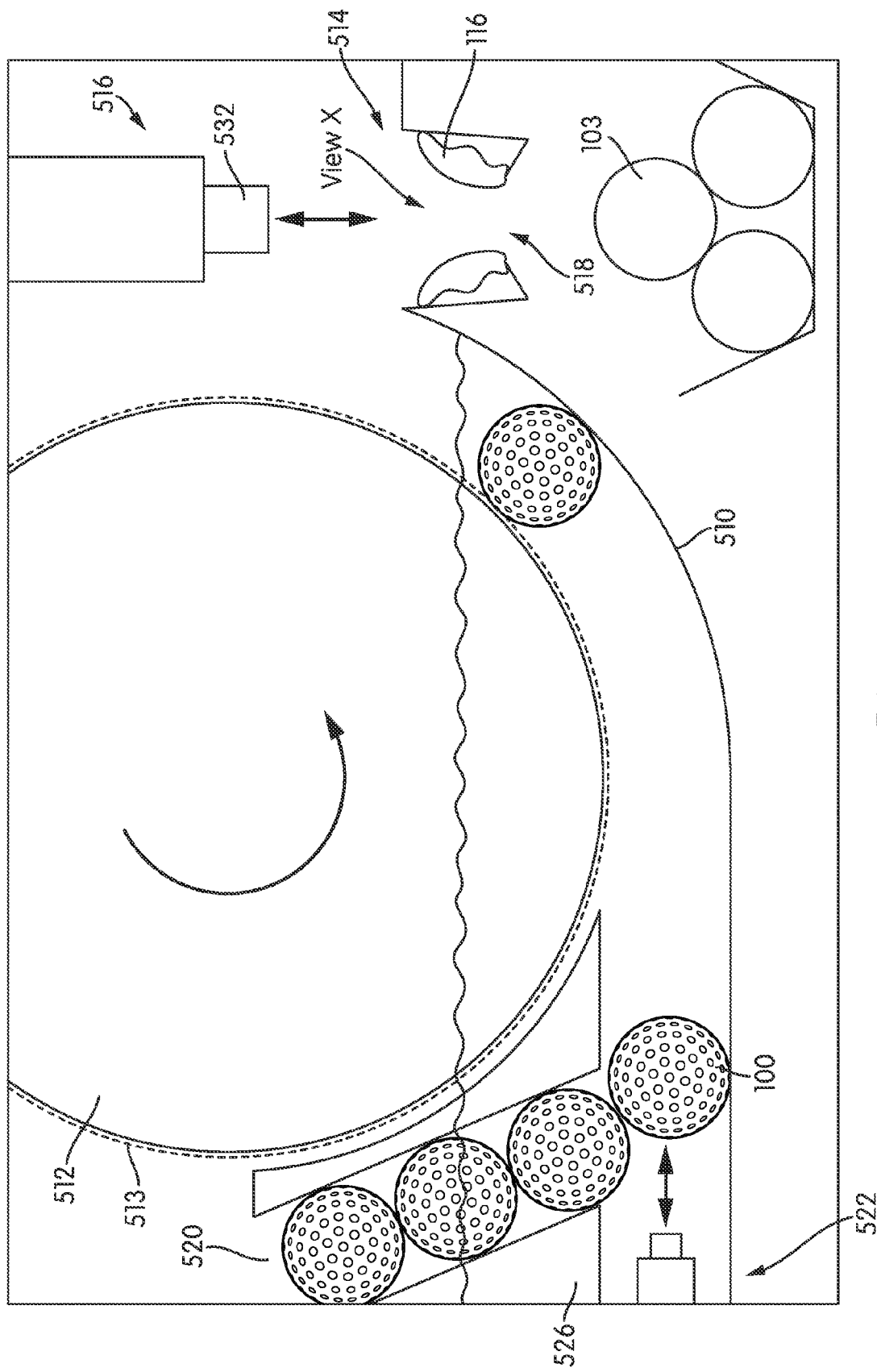
FIG. 5 shows a portion of a second example system for recycling a golf ball that includes removing a golf ball cover from the golf ball.

Turning now to FIG. 5, a second example system 500 is shown in schematic form as a portion of a system for recycling a golf ball that includes removing a golf ball outer shell portion from the golf ball. Second system 500 generally includes the aspects and preferences noted above with respect to first system 200 of FIG. 2 except as noted below. Second system 500 primarily differs from first system 200 via the scorer-driver being configured as a cutting blade 512 rather than a chain. Cutting blade 512 is generally a saw-type cutting blade having teeth 513 or other cutting features that cut through a portion of the golf ball cover 116 while advancing the golf ball 100 along guide 510.

Cutting blade 512 is shown as a single large rotating circular blade, but it is understood that various other cutting blade configurations and scorer-driver configurations can be used, such as a plurality of small rotating cutting blades that can engage a golf ball in series and/or simultaneously as spaced apart cutting blades. As with the configuration of FIG. 2, the one or more cutting blades 512 induce failure regions in the golf ball cover (e.g., cuts) substantially simultaneously with advancing the golf balls 100 along guide 510, which can be performed via engagement of the cover 116 by saw teeth 513. Preferably, the one or more cutting blades do not cut completely through the golf ball cover and, thus, avoid damaging the recyclable inner core portion 103 via the cutting process. Other scorer-driver configurations can include features such as roughened belts similar to sanding belts that can engage the golf ball covers, rotating discs, stones or wheels that can engage the covers, etc.

Figure 6:
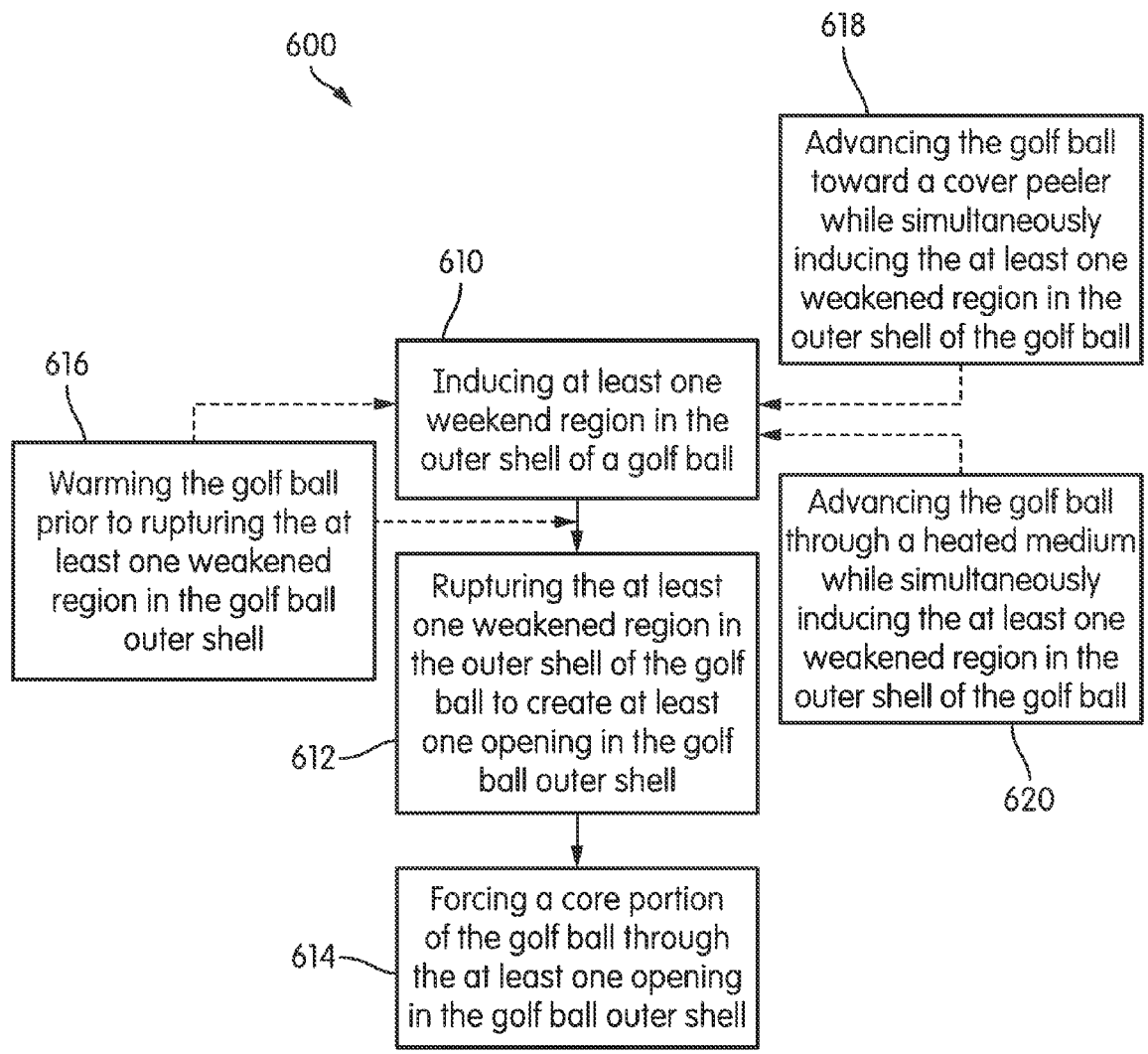
FIG. 6 illustrates an example method for recycling a golf ball that includes removing a golf ball cover from the golf ball, which can include various method features and options that can be mixed and combined to provide desired features or advantages.

FIG. 6 generally illustrates an example method 600 for recycling a golf ball that includes removing a golf ball cover from the golf ball. Method 600 can be practiced along with example systems 200 and 500 of FIGS. 2, 3A, 3B, 4A, 4B and 5, and with other systems and system configurations for recycling a golf ball. Further, method 600 can include various method features and options that are noted herein and/or are appropriate for the art in many different combinations.

As shown, method 600 generally includes a step 610 of inducing at least one weakened region in the outer shell of a golf ball, a step 612 of rupturing the at least one weakened region to create at least one opening in the golf ball outer shell, and a step 614 of forcing a core portion of the golf ball through the at least one opening in the golf ball outer shell. Method 600 can also include a step 616 of warming the golf ball prior to rupturing the at least one weakened region in the golf ball outer shell, which can be performed prior to, simultaneously with, or after step 610 of inducing at least one weakened region in the outer shell of the golf ball. The method can also include a step 618 of advancing the golf ball toward a cover peeler while simultaneously inducing the at least one weakened region in the golf ball outer shell, and a step 620 of advancing the golf ball through a heated medium while simultaneously inducing the at least one weakened region in the golf ball outer shell.

Figure 7:
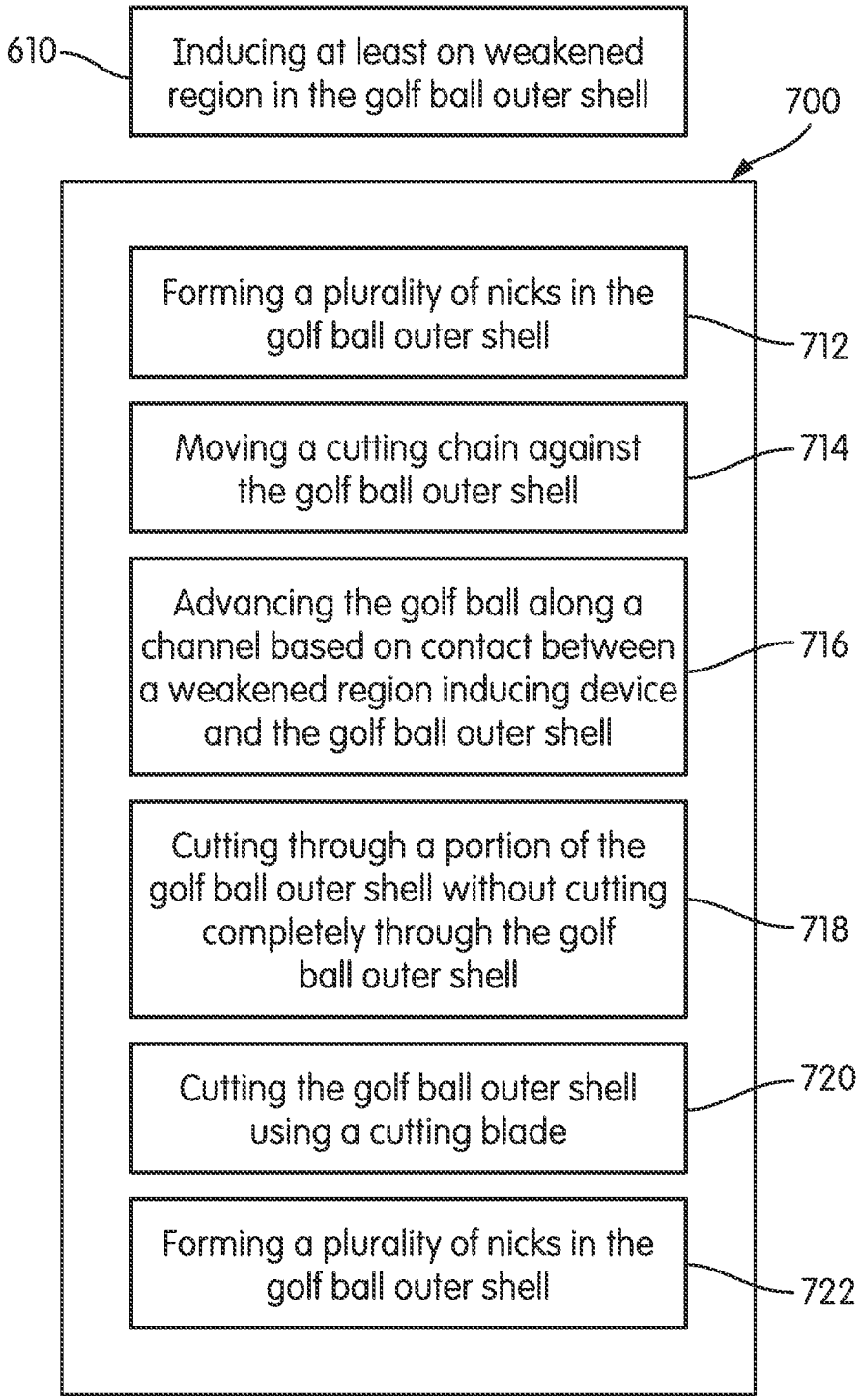
FIG. 7 illustrates example features and options that can be included with the method of FIG. 6 in various combinations as part of the method feature of inducing at least one weakened region in the golf ball outer shell.

Method 600 can also include various other steps and features, such as the example steps shown in FIG. 7. The steps shown in FIG. 7 can be performed along with or part of step 610 of inducing at least one weakened region in the golf ball outer shell. As such, inducing the at least one weakened region can include a step 712 of forming a plurality of nicks in the golf ball outer shell, a step 714 of moving a cutting chain against the golf ball outer shell, and/or a step 716 of advancing the golf ball along a channel or guide based on contact between a weakened region inducing device and the golf ball outer shell. Further, step 610 can include a step 718 of cutting through a portion of the golf ball outer shell without cutting completely through the outer shell, a step 720 of cutting the golf ball outer shell using a cutting blade, and/or a step 722 of forming a plurality of nicks in the golf ball outer shell.

While various configurations of the invention have been described, the description is intended to be exemplary, rather than limiting and it will be apparent to those of ordinary skill in the art that many more configurations and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A system for refurbishing or recycling a golf ball via removing a golf ball cover from a golf ball core, the system comprising:
    a golf ball guide;
    a golf ball scorer-driver configured for scoring the outer shell of a golf ball while simultaneously advancing the golf ball along a portion of the golf ball guide based on contact between the golf ball scorer-driver and the golf ball;
    a golf ball cover peeler having an orifice formed therein with an inner diameter that is less than an outer diameter of the golf ball cover; and
    a press configured to drive a golf ball core through the cover peeler orifice.

2. The system of claim 1, further comprising:
    a container disposed about at least a portion of the golf ball guide; and
    a heated medium configured for heating the golf ball while the golf ball is disposed in the at least one portion of the golf ball guide.

3. The system of claim 2, wherein the heated medium comprises a heated fluid.

4. The system of claim 3, wherein the heated medium comprises water.

5. The system of claim 1, wherein the golf ball scorer-driver comprises a driven chain having a plurality of scoring extensions.

6. The system of claim 1, wherein the golf ball scorer-driver comprises a driven chain having a plurality of cutting blades.

7. The system of claim 1, wherein the golf ball scorer-driver comprises a rotating saw blade.

8. A method of refurbishing a layered article, the method comprising:
    inducing at least one weakened region in the outer shell of the layered article;
    rupturing the at least one weakened region in the outer shell of the layered article to create at least one opening in the layered article outer shell; and
    forcing an inner portion of the layered article through the at least one opening in the layered article outer shell;
    wherein inducing at least one weakened region in the layered article outer shell comprises creating at least one score in the layered article outer shell without cutting through the layered article outer shell;
    wherein creating at least one score in the layered article outer shell includes cutting the layered article outer shell using a cutting blade; and
    wherein creating at least one score in the layered article outer shell includes advancing the layered article along a channel based on contact with the cutting blade urging the layered article to advance along the channel.

9. The method of claim 8, further comprising warming the layered article prior to rupturing the at least one weakened region in the layered article outer shell including placing the layered article in a heated medium.

10. The method of claim 9, wherein inducing at least one weakened region in the layered article outer shell is performed while warming the layered article prior to rupturing the at least one weakened region in the layered article outer shell.

11. The method of claim 8, wherein the method further comprises advancing the layered article toward a cover peeler while simultaneously performing the step of inducing at least one weakened region in the layered article outer shell.

12. The method of claim 8, wherein the method further comprises advancing the layered article through a heated medium while simultaneously performing the step of inducing at least one weakened region in the layered article outer shell.

13. The method of claim 8, wherein forcing a core portion of the layered article through the at least one opening in the layered article outer shell includes driving the layered article against perimeter portions of a cover peeler orifice, the cover peeler orifice having an inner diameter that is less than the outer diameter of the layered article.

14. The method of claim 13, wherein, for driving the layered article against the cover peeler orifice perimeter portions, the cover peeler orifice inner diameter has about the same diameter as the layered article core outer diameter.

15. The method of claim 13, wherein driving the layered article against the cover peeler orifice perimeter portions, the cover peeler orifice has an inner diameter that is less than the layered article core outer diameter.

16. The method of claim 8, wherein forcing the layered article core portion through the at least one opening in the layered article outer shell includes driving the layered article core through an orifice formed in a cover peeler, the cover peeler orifice having an inner diameter that is less than the layered article outer shell outer diameter.

17. The method of claim 8, wherein forcing the layered article core portion through the at least one opening in the layered article outer shell includes extruding the layered article core portion through an orifice formed in a cover peeler, the cover peeler orifice having an inner diameter that is less than the layered article core outer diameter.

18. The method of claim 8, further comprising forming a new outer shell around the layered article core portion.

19. A method of refurbishing a layered article, the method comprising:
    inducing at least one weakened region in the outer shell of the layered article;
    rupturing the at least one weakened region in the outer shell of the layered article to create at least one opening in the layered article outer shell; and
    forcing an inner portion of the layered article through the at least one opening in the layered article outer shell, wherein forming a plurality of nicks in the layered article outer shell includes advancing the layered article along a channel based on contact with the cutting blade urging the layered article to advance along the channel.

20. The method of claim 19, wherein forming the plurality of nicks in the layered article outer shell includes moving a cutting chain against the layered article outer shell.

21. The method of claim 19, wherein forcing a core portion of the layered article through the at least one opening in the layered article outer shell includes driving the layered article core through an orifice formed in a cover peeler while retaining the layered article outer shell.

* * * * *